United States Patent
Barton et al.

(10) Patent No.: US 11,220,922 B1
(45) Date of Patent: Jan. 11, 2022

(54) MONOLITHIC DIFFUSER AND DESWIRL FLOW STRUCTURE FOR GAS TURBINE ENGINE

(71) Applicant: HONEYWELL INTERNATIONAL INC., Morris Plains, NJ (US)

(72) Inventors: Michael Barton, Phoenix, AZ (US); Raymond Mccage, Chandler, AZ (US); Derek Rice, Cave Creek, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/903,657

(22) Filed: Jun. 17, 2020

(51) Int. Cl.
*F01D 9/06* (2006.01)

(52) U.S. Cl.
CPC .......... *F01D 9/065* (2013.01); *F05D 2220/32* (2013.01); *F05D 2230/10* (2013.01); *F05D 2230/31* (2013.01); *F05D 2240/127* (2013.01); *F05D 2260/60* (2013.01)

(58) Field of Classification Search
CPC ................ F01D 9/065; F05D 2220/32; F05D 2240/127; F05D 2230/10; F05D 2230/31; F05D 2260/60
See application file for complete search history.

(56) References Cited

U.S. PATENT DOCUMENTS

| | | | |
|---|---|---|---|
| 6,589,015 B1 | 7/2003 | Roberts et al. | |
| 6,735,956 B2 * | 5/2004 | Romani | F01D 5/081 60/806 |
| 7,708,519 B2 * | 5/2010 | Mignano | F02C 7/18 415/157 |
| 9,435,206 B2 * | 9/2016 | Johnson | F01D 5/084 |
| 9,644,495 B2 | 5/2017 | Zurmehly et al. | |
| 9,777,698 B2 | 10/2017 | Schlak | |
| 9,868,155 B2 | 1/2018 | Gerber et al. | |
| 10,359,051 B2 | 7/2019 | Gage et al. | |

(Continued)

OTHER PUBLICATIONS

Allison, Timothy C., et al. "Manufacturing and Testing Experience with Direct Metal Laser Sintering for Closed Centrifugal compressor Impellers," 43rd Turbomachinery & 30th Pump User Symposia (Pump & Turbo 2014); Sep. 23-25, 2014, Houston, TX, pumpturbo. tamu.edu.

(Continued)

*Primary Examiner* — Igor Kershteyn
(74) *Attorney, Agent, or Firm* — Lorenz & Kopf, LLP

(57) ABSTRACT

A diffuser and deswirl flow structure includes a plurality of tube structures with an outer wall that is hollow and elongate and that extends between a first portion and a second portion. The plurality of tube structures is disposed in an annular arrangement about the longitudinal axis. The flow structure also includes a plurality of flow passages extending through the tube structures. The plurality of flow passages extend from the first portion to the second portion, respectively. The plurality of flow passages respectfully include a diffuser portion, which is proximate the first portion and configured to diffuse a fluid flow from a compressor wheel. The plurality of flow passages respectfully include a deswirl portion, which is proximate the second portion and configured to deswirl the fluid flow from the diffuser portion. The outer wall defines the diffuser portion and the deswirl portion. The outer wall is self-supporting.

20 Claims, 6 Drawing Sheets

(56) References Cited

U.S. PATENT DOCUMENTS

| | | |
|---|---|---|
| 2006/0045772 A1* | 3/2006 | Slovisky ............... F04D 29/444 |
| | | 417/423.1 |
| 2017/0074102 A1 | 3/2017 | Plante et al. |
| 2017/0114797 A1 | 4/2017 | Duong |
| 2017/0189966 A1 | 7/2017 | Giannozzi et al. |
| 2017/0260866 A1 | 9/2017 | Meadows et al. |
| 2018/0266433 A1 | 9/2018 | Iurisci et al. |
| 2018/0355887 A1 | 12/2018 | Wood et al. |
| 2019/0285081 A1 | 9/2019 | Sishtla et al. |
| 2019/0316600 A1 | 10/2019 | Duong |
| 2020/0011337 A1 | 1/2020 | Tangudu et al. |
| 2020/0049076 A1* | 2/2020 | Ke ........................... F02C 7/24 |

OTHER PUBLICATIONS

Ioannou, Eleni, et al., "Lightweight High-Pressure Ratio Centrifugal Compressor for Vehicles-Investigation of Pipe Diffuser Designs by Means of CFD," Jan. 2016.

Meier, Matthew, et al., Considerations for Using Additive Manufacturing Technology in Centrifugal Compressor Research, Journal of Engineering for Gas Turbines and Power 142 (3), Sep. 2019.

* cited by examiner

MONOLITHIC DIFFUSER AND DESWIRL FLOW STRUCTURE FOR GAS TURBINE ENGINE

TECHNICAL FIELD

The present invention generally relates a gas turbine engine and, more particularly, relates to a monolithic diffuser and deswirl flow structure for a gas turbine engine.

BACKGROUND

Gas turbine engines include a number of features configured for providing desired fluid flow characteristics. Some turbomachines include a diffuser feature that diffuses fluid (e.g., air) received from a compressor wheel as the fluid flows downstream. Also, some turbomachines include a deswirl feature that deswirls the fluid as it flows further downstream, for example, to a combustion section of the engine. As such, particular flow characteristics can be provided that improve engine efficiency, etc.

However, these fluid flow features can suffer from certain disadvantages. For example, these features may include a relatively large number of parts and/or they can be relatively bulky and heavy. Also, assembling these structures can be difficult, inconvenient, and time consuming. Thus, manufacturing costs can be relatively high.

In addition, the aerodynamic performance of these fluid flow features may be deficient at some operating conditions. For example, unintended leakage may occur between assembled parts along the flow path, resulting in efficiency losses.

Hence, there is a need for an improved diffuser and deswirl fluid flow structure for a gas turbine engine that provides desired fluid flow characteristics. There is also a need for improved manufacturing methods for such a structure.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A diffuser and deswirl flow structure for a gas turbine engine defining a longitudinal axis is disclosed. The fluid flow structure includes a plurality of tube structures that has an outer wall that is hollow and elongate and that extends between a first portion and a second portion of the respective one of the plurality of tube structures. The plurality of tube structures is disposed in an annular arrangement about the longitudinal axis. The flow structure also includes a plurality of flow passages extending through respective ones of the plurality of tube structures. The plurality of flow passages extend from the first portion to the second portion, respectively. The plurality of flow passages respectfully include a diffuser portion, which is proximate the first portion and configured to diffuse a fluid flow from a compressor wheel. The plurality of flow passages respectfully include a deswirl portion, which is proximate the second portion and configured to deswirl the fluid flow from the diffuser portion. The outer wall defines the diffuser portion and the deswirl portion. The outer wall is self-supporting.

Also, a tube structure for a flow structure of a gas turbine engine is disclosed. The tube structure is configured for annular arrangement with a plurality of additional tube structures about a longitudinal axis to define the flow structure. The tube structure includes an outer wall that is hollow and elongate and that extends between a first portion and a second portion along a tube axis. The tube structure also includes a flow passage extending through the tube structure along the tube axis from the first portion to the second portion. The flow passage includes a diffuser portion, which is proximate the first portion and configured to diffuse a fluid flow from a compressor wheel. The flow passage respectfully includes a deswirl portion, which is proximate the second portion and configured to deswirl the fluid flow from the diffuser portion. The outer wall defines the diffuser portion and the deswirl portion. The outer wall is self-supporting.

Furthermore, a method of manufacturing a diffuser and deswirl flow structure for a gas turbine engine defining a longitudinal axis is disclosed. The method includes forming a plurality of tube structures. The tube structures respectively include an outer wall that is hollow and elongate and that extends respectively between a first portion and a second portion. The plurality of tube structures are disposed in an annular arrangement about the longitudinal axis. The method also includes defining a plurality of flow passages extending through respective ones of the plurality of tube structures. The plurality of flow passages extend from the first portion to the second portion, respectively. The plurality of flow passages are defined to respectively include a diffuser portion, which is proximate the first portion and configured to diffuse a fluid flow from a compressor wheel. The plurality of flow passages are defined to respectively include a deswirl portion, which is proximate the second portion and configured to deswirl the fluid flow from the diffuser portion. The outer wall defines the diffuser portion and the deswirl portion. The outer wall is self-supporting.

Other desirable features and characteristics of the apparatus and method will become apparent from the subsequent detailed description and the appended claims, taken in conjunction with the accompanying drawings and the preceding background.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the present disclosure and not to limit the scope of the present disclosure which is defined by the claims. Furthermore, there is no intention to be bound by any expressed or implied theory presented in the preceding technical field, background, brief summary, or the following detailed description.

Broadly, embodiments of the present disclosure include a gas turbine engine with a combination diffuser and deswirl flow structure. In some embodiments, the flow structure is a monolithic, unitary, one-piece structure that includes a plurality of tube structures that are connected together and arranged annularly about a central axis. An outer wall of the tube structures may define a respective flow passage (i.e., channel, duct, etc.) therethrough. The outer wall may extend continuously between the diffuser and deswirl portions of the flow structure. The diffuser and deswirl portions may be tailored for the particular compressor section for improved performance.

Also, the outer wall may include a number of features that improve the structural strength and robustness of the part. The flow structure may additionally include weight-saving features for improving fuel efficiency of the gas turbine engine.

Furthermore, one or more features are provided for facilitating manufacture of the diffuser and deswirl structure. In some embodiments, for example, the flow structure may be additively manufactured. The flow structure can, therefore, include features for facilitating additive manufacture. In addition, the outer wall of the flow structures may be configured to be self-supporting during the additive manufacturing process. As such, internal supports within the flow structure may be unnecessary, which provides weight savings, reduces material cost, and provides other benefits.

Figure 1:
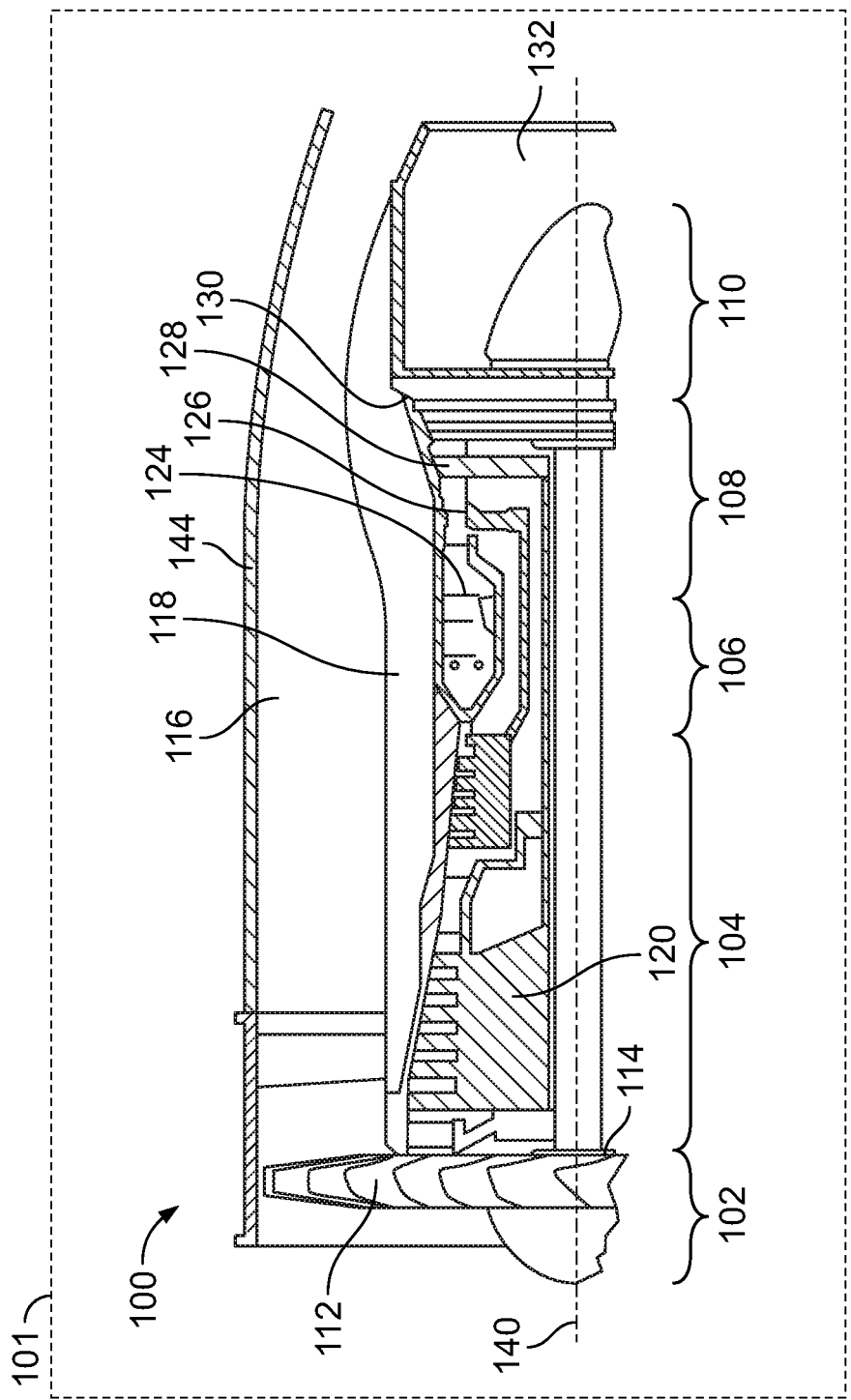
FIG. 1 is a schematic view of a gas turbine engine according to example embodiments of the present disclosure.

With reference to FIG. 1, a partial, cross-sectional view of an exemplary gas turbine engine 100 is shown with the remaining portion of the gas turbine engine 100 being substantially axisymmetric about a longitudinal axis 140, which also defines an axis of rotation for the gas turbine engine 100. In the depicted embodiment, the gas turbine engine 100 is an annular multi-spool turbofan gas turbine jet engine within an aircraft (represented schematically at 101), although features of the present disclosure may be included in other configurations, arrangements, and/or uses. For example, in other embodiments, the gas turbine engine 100 may assume the form of a non-propulsive engine, such as an Auxiliary Power Unit (APU) deployed onboard the aircraft 101, or an industrial power generator.

In this example, with continued reference to FIG. 1, the gas turbine engine 100 includes a fan section 102, a compressor section 104, a combustor section 106, a turbine section 108, and an exhaust section 110. In one example, the fan section 102 includes a fan 112 mounted on a rotor 114 that draws air into the gas turbine engine 100 and compresses it. A fraction of the compressed air exhausted from the fan 112 is directed through the outer bypass duct 116 and the remaining fraction of air exhausted from the fan 112 is directed into the compressor section 104. The outer bypass duct 116 is generally defined by an outer casing 144 that is spaced apart from and surrounds an inner bypass duct 118.

In the embodiment of FIG. 1, the compressor section 104 includes one or more compressors 120. The number of compressors 120 in the compressor section 104 and the configuration thereof may vary. The one or more compressors 120 sequentially raise the pressure of the air and direct a majority of the high-pressure fluid or air into the combustor section 106. In the combustor section 106, which includes a combustion chamber 124, the high-pressure air is mixed with fuel and is combusted. The high-temperature combustion air or combustive gas flow is directed into the turbine section 108. In this example, the turbine section 108 includes three turbines disposed in axial flow series, namely, a high-pressure turbine 126, an intermediate pressure turbine 128, and a low-pressure turbine 130. However, it will be appreciated that the number of turbines, and/or the configurations thereof, may vary. In this embodiment, the high-temperature combusted air from the combustor section 106 expands through and rotates each turbine 126, 128, and 130. The combustive gas flow then exits the turbine section 108 for mixture with the cooler bypass airflow from the outer bypass duct 116 and is ultimately discharged from the gas turbine engine 100 through the exhaust section 132. As the turbines 126, 128, 130 rotate, each drives equipment in the gas turbine engine 100 via concentrically disposed shafts or spools.

Figure 2:
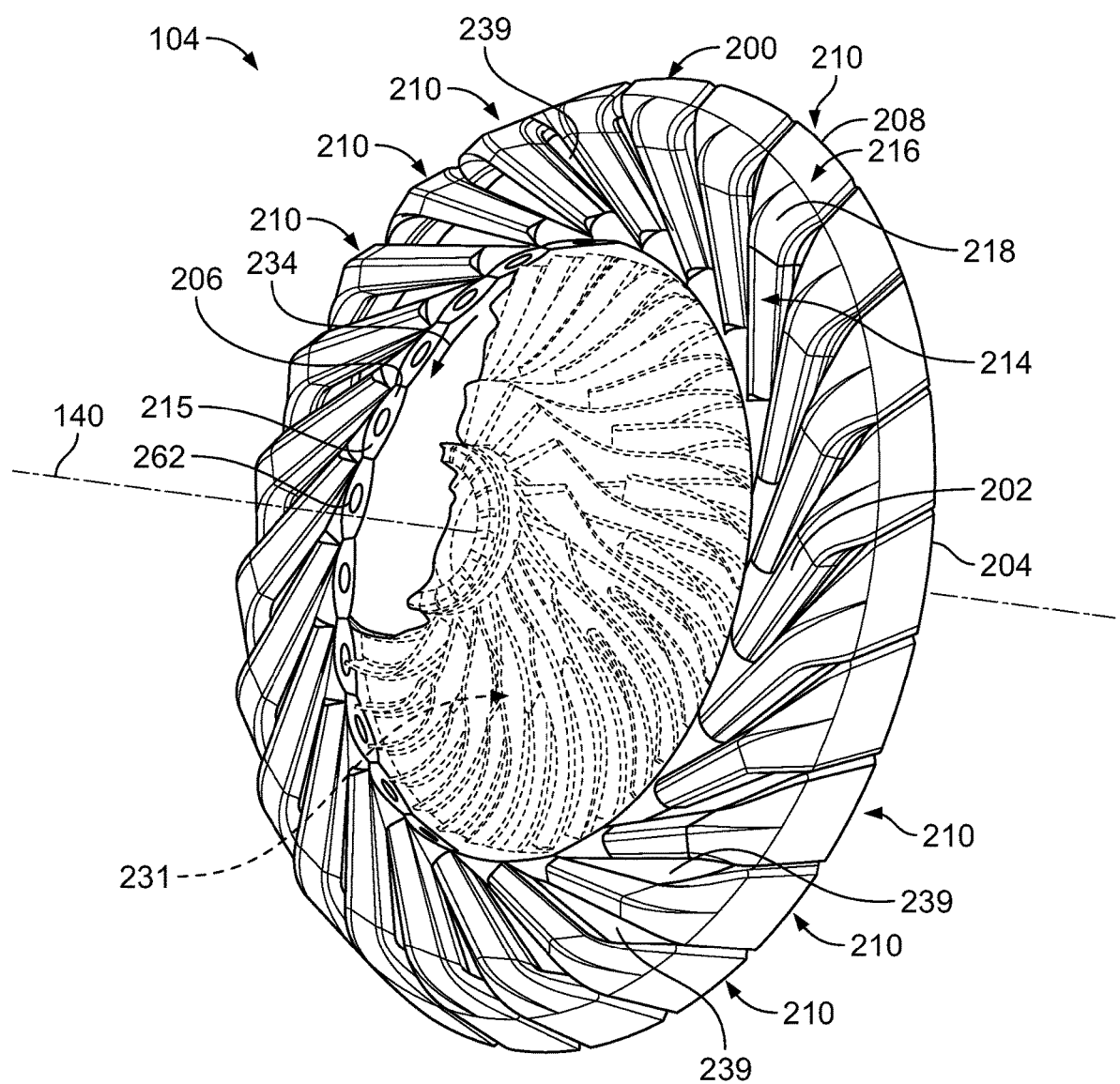
FIG. 2 is an isometric view of a diffuser and deswirl structure of the gas turbine engine of FIG. 1.

Referring now to FIG. 2, the compressor section 104 will be discussed in greater detail according to example embodiments. As shown, one stage of the compressor section 104 may include a compressor wheel 231 (shown in phantom), which is supported for rotation about the axis 140. The compressor wheel 231 may rotate within a shroud member (hidden in FIG. 2), and an airflow may flow through a passage cooperatively defined by the shroud member and the compressor wheel.

This airflow may be received by a diffuser and deswirl flow structure 200, which is represented in FIG. 2 according to example embodiments. As shown, the flow structure 200 may be annular and substantially centered on the axis 140. The flow structure 200 may include a forward side 202, an aft side 204, an inner radial portion 206, and an outer radial portion 208. The compressor wheel 231 is received within the flow structure 200 with the inner radial portion 206 facing the outer radial edge of the wheel 231, with the forward side 202 and the forward face of the wheel 231 facing forward along the axis 140, and with the aft side 204 and the aft face of the wheel 231 facing rearward along the axis 140.

The flow structure 200 may include a plurality of tube structures 210. The plurality of tube structures 210 may be disposed in an annular arrangement about the axis 140. One of the tube structures 210 is shown in isolation in FIG. 3 according to example embodiments of the present disclosure.

As shown, the tube structure 210 may be an elongate member having a first portion 214 and second portion 216 that are separated longitudinally with a bend 218 disposed therebetween. The tube structure 210 may be hollow and may be defined by an outer wall 212.

The first portion 214 may include and/or terminate at a first end 213. The first end 213 may include a surface 215 that partly defines the inner radial portion 206 of the flow structure 210 (FIG. 2). The surface 215 may be arcuate and curved about the axis 140. The surface 215 may have concave curvature. Also, the surface 215 may be substantially ovate in shape. Additionally, the surface 215 may be open-ended for inletting flow into the tube structure 210.

The second portion 216 may include and/or terminate at a second end 217 of the tube structure 210. The second end 217 may partly define the outer radial portion 208 of the flow structure 210 (FIG. 2). The second end 217 may be rectangular and may define a rectangular lip 219. The second end 217 may be open-ended for outletting flow from the tube structure 210 as will be discussed in more detail below.

The tube structure 210 may define a longitudinal tube axis 250. The tube axis 250 may intersect the first end 213, extend along the first portion 214, turn along the bend 218, extend along the second portion 216, and extend normal to the second end 217. One or more segments of the outer wall 212 may be centered about the axis 250. It will be appreciated that different embodiments of the tube structure 210 may have different shapes and configurations, and the tube axis 250 may extend in a number of directions without departing from the scope of the present disclosure. In some embodiments, for example, the tube structure 210 widens/enlarges in cross section as it extends along tube axis 250 from the first end 213 to the second end 217. The tube structure 210 may widen in a first cross-wise direction 252 (i.e., a direction extending between a first side 236 and a second side 238 of the tube structure 210). The tube structure 210 may also widen somewhat in a second cross-wise direction 240 (i.e., a direction normal to the first cross-wise direction 252 and the tube axis 250).

As shown in FIG. 2, the tube structures 210 may be attached together and arranged annularly about the axis 140. The first sides 236 of the tube structures 210 may be attached to the second side 238 of the neighboring (i.e., adjacent) tube structure 210 in succession about the axis 140. The tube structures 210 may be fixedly attached at the first ends 213 along the first and second sides 236, 238. The tube structures 210 may also be fixedly attached at the second ends 217 along the first and second sides 236, 238. Furthermore, as shown in FIG. 2, there may be spaces 239 defined between the first portions 214 of the tube structures 210. The spaces 239 may be generally triangular in shape when viewed axially and may define open space extending between the forward side 202 and the aft side 204. These spaces 239 may provide weight savings for the flow structure 200.

The first ends 213 of the tube structures 210 may collectively define the inner radial portion 206 of the flow structure 200. The second ends 217 of the tube structures 210 may collectively define the outer radial portion 208 of the flow structure 200. The tube structures 210 may also collectively define the forward side 202 and the aft side 204 of the flow structure. As shown in FIG. 2, the tube structures 210 may be arranged as eccentric spokes on the annular diffuser/deswirl flow structure 200. The first portions 214 of the tube structures 210 may extend substantially radially with respect to the axis 140. The bend 218 in the tube structures 210 may direct the second portions 216 of the tube structures 210 somewhat axially in the aft-facing direction with respect to the axis 140.

In some embodiments, the diffuser/deswirl flow structure 200 may be a unitary, one-piece monolithic part. As such, the tube structures 210 may be integrally attached together to define the monolithic structure 200. In some embodiments, the flow structure 200 may be formed via an additive manufacturing process such that the outer walls 212 of plural tube structures 210 are formed simultaneously and integrally attached. However, it will be appreciated that, in other embodiments, the tube structures 210 may be independently formed and then subsequently connected and arranged in the annular arrangement of FIG. 2. In still other embodiments, the flow structure 200 may be a cast part that is integrally formed and monolithic. In further embodiments, parts may be assembled and fixedly attached together via brazing, using fasteners, or other attachments to define the flow structure 200.

As mentioned above, the tube structures 210 may be hollow. As such, the flow structure 200 includes a plurality of flow passages 220. The flow passages 220 may extend through respective ones of the plurality of tube structures 210 from the first end 213 to the second end 217. The outer wall 212 may be hollow such that the interior defines the flow passage 220 for the respective tube structure 210.

Figure 3:
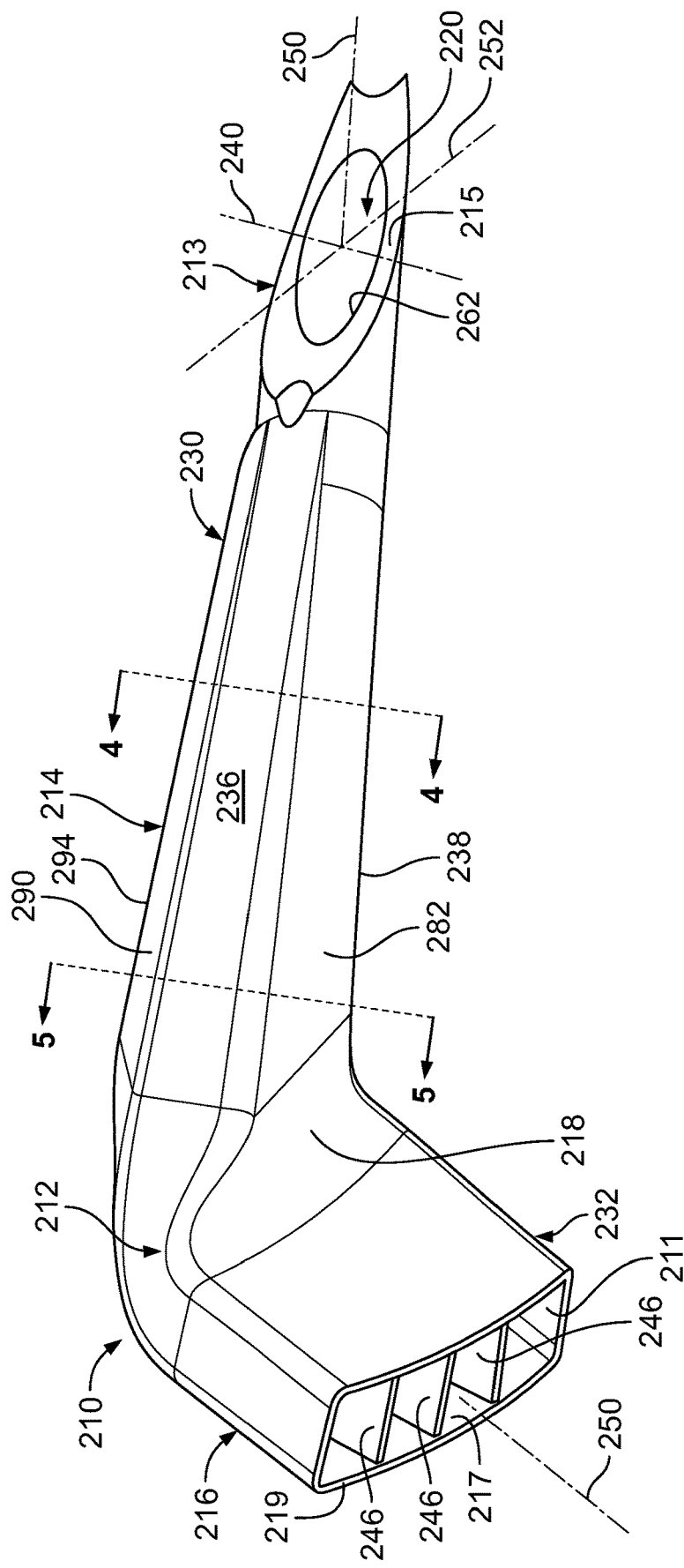
FIG. 3 is an isometric view of a tube structure of the diffuser and deswirl structure of FIG. 2.
Figure 7:
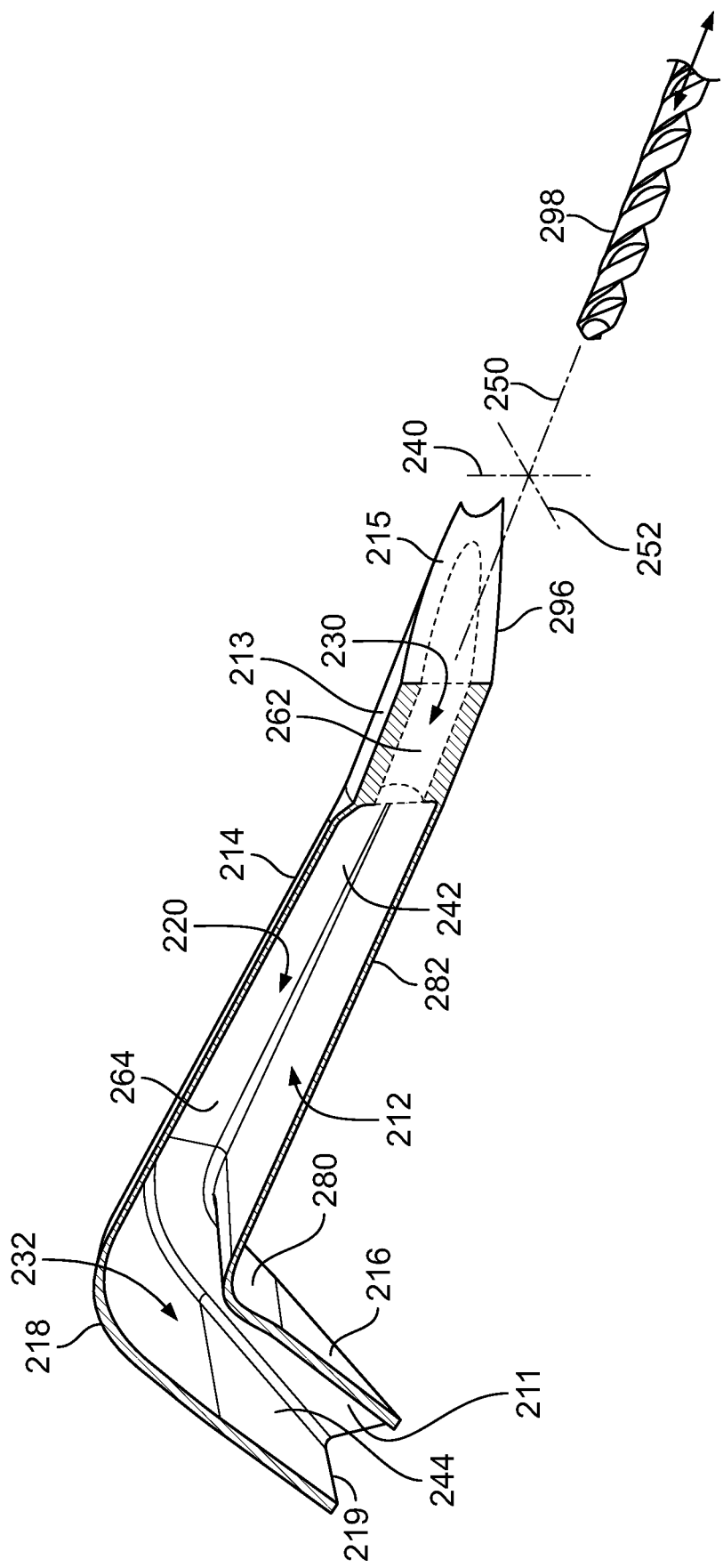
FIG. 7 is a schematic view representing further methods of manufacturing the diffuser and the deswirl structure of FIG. 2.

As shown in FIG. 7, the flow passage 220 may include a first segment 242 that extends (substantially radially) through the first portion 214. The first segment 242 may include an inlet 262 into the flow passage 220. The inlet 262 may be a hole with a circular cross section. The inlet 262 may extend along and may be centered substantially on the tube axis 250. In other embodiments, the axis of the inlet 262 may be slightly eccentric, disposed at an acute angle, etc. relative to the tube axis 250. As shown in FIG. 3, the surface 215 of the first end 213 may be disposed at an angle relative to the tube axis 250; therefore, the inlet 262 may be ovate in shape where it intersects the surface 215. The first segment 242 may also include an intermediate portion 264 (FIG. 7), which gradually widens outward along the cross-wise direction 252. The outer wall 212 may also have a constant wall thickness along the intermediate portion 264.

Further downstream, the flow passage 220 may extend continuously through the bend 218 to open into a second segment 244 (FIG. 7) that extends through the second portion 216. The second segment 244 may widen slightly as it extends downstream. The second segment 244 may terminate at an outlet 211 defined by the lip 219. The outer wall 212 may have a substantially constant wall thickness throughout the second segment 244. Optionally, the second segment 244 may include one or more deswirl vanes 246 (FIG. 3) for directing fluid flow out of the tube structure 210. The deswirl vanes 246 may have a variety of shapes and configurations without departing from the scope of the present disclosure. For example, as shown, the deswirl vanes 246 may be flat with uniform thickness; however, in other embodiments, the vanes 246 may have nonuniform thickness, may have at least one contoured surface, etc.

The flow passage 220 may extend continuously from the first end 213 to the second end 217 of the respective tube structure 210. The flow passage 220 may define a downstream direction along the tube axis 250 from the inlet 262 to the outlet 211. Accordingly, the inlets 262 of the tube structures 210 may receive a fluid flow 234 (a compressed air stream indicated in FIG. 2) from the compressor wheel 231, that is directed along the axis 250 through the flow passage 220, and that is outlet via the outlets 211 toward the combustor section 106.

The tube structures 210 may condition, control, or otherwise affect the fluid flow 234 as it moves along the flow passage 220. For example, as shown in FIG. 7, the flow passage 220 may define a diffuser portion 230 and a deswirl portion 232. The diffuser portion 230 may be proximate to and may extend through the first portion 214 of the tube structure 210. The diffuser portion 230 may be configured for diffusing the fluid flow 234 (i.e., for slowing the high-velocity discharge from the compressor wheel 231 to increase the air pressure at a slower velocity). The shape, dimension, configuration, etc. of the inlet 262, the intermediate portion 264, and/or the bend 218 may be chosen for diffusing the fluid flow 234 during operation of the gas turbine engine 100. The deswirl portion 232 may be proximate to and may extend primarily through the second portion 216 of the tube structure 210. The deswirl portion 232 may be configured for reducing swirling within the flow 234 received from the diffuser portion 230, thereby providing desired conditions within the flow 234 for the combustor section 106. Thus, the shape, dimension, configuration, etc. of the bend 218, the second segment 244, the optional vanes 246, and/or the outlet 211 may be chosen for deswirling the fluid flow 234 during operation of the gas turbine engine 100.

The diffuser and deswirl flow structure 200 may be manufactured in many different ways without departing from the scope of the present disclosure. In some embodiments, the diffuser/deswirl flow structure 200 may be additively manufactured using any type of additive manufacturing process which utilizes layer-by-layer construction, including, but not limited to: selective laser melting; direct metal deposition; direct metal laser sintering (DMLS); direct metal laser melting; electron beam melting; electron beam wire melting; micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; laser engineered net shaping; Direct Metal Electron Beam Fusion (DMEBF); and other powder consolidation techniques. In one particular exemplary embodiment, direct metal laser fusion (DMLF) may be used to manufacture the flow structure 200. DMLF is a commercially available laser-based rapid prototyping and tooling process by which complex parts may be directly produced by precision melting and solidification of metal powder (the "build material") into successive layers of larger structures, each layer corresponding to a cross-sectional layer of the flow structure 200.

Figure 6:
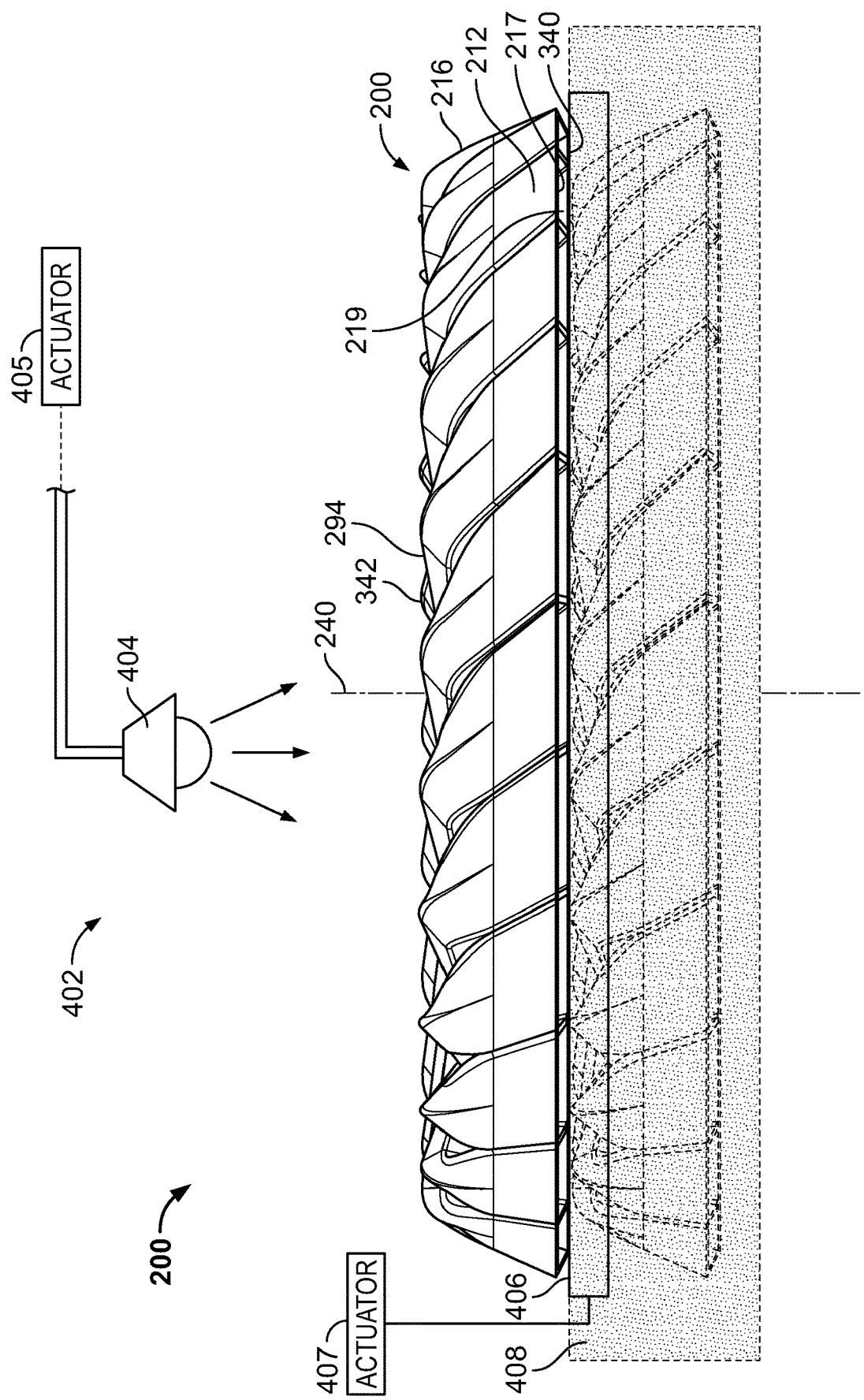
FIG. 6 is a schematic view representing methods of manufacturing the diffuser and deswirl structure of FIG. 2.

In some embodiments, a majority of the flow structure 200 may be formed using additive manufacturing processes, and additional features may be formed subsequently via other processes. For example, as represented in FIGS. 6 and 7, the flow structure 200 may be additively manufactured with the flow passages 220 partially formed (FIG. 6), and the flow passages 220 may be completed by removing material (FIG. 7) in a machining process.

More specifically, the flow structure 200 may be additively manufactured layer-by-layer such that the outer wall 212 progressively forms along a growth axis 240. In some embodiments, the growth axis 240 may be substantially parallel to the longitudinal axis 140. Also, in some embodiments, the growth axis 240 may be directed from the aft side 204 toward the forward side 202. Accordingly, the outer wall 212 may be built layer-by-layer starting from a leading edge 340 to a trailing edge 342. The leading edge 340 may correspond to the aft-most portion of the lip 219 of second end 217. The trailing edge 342 may correspond to a forward-most ridge 344 of the flow structure 200.

The tube structures 210 and/or other portions of the flow structure 200 may include features that facilitate the additive manufacturing process or otherwise improve manufacturing efficiency. For example, the outer wall 212 may include various features that cause it to be self-supporting. Stated differently, the outer wall 212 may be shaped, dimensioned, and configured to support itself such that internal supports, struts, braces, scaffolding, or other supporting structures extending within the outer wall 212 are unnecessary. As such, the internal flow passage 220 defined by the outer wall 212 may remain free of these obstructions.

In particular, the outer wall 212 may self-support as it is built layer-by-layer during the additive manufacturing process. The wall 212 may form and grow at a slight angle relative to the growth axis 240 and may span gradually away from the axis 240 rather than spanning directly transverse to the growth axis 240. As such, the wall 212 can support itself as it grows and is unlikely to collapse under its own weight. Also, there may be minimal build-up of the wall 212 parallel to growth axis 240. This avoids heat build-up, warpage of the wall 212, etc. during formation of the wall 212.

The flow structure 200 may be additively manufactured using an additive manufacturing device 402 as represented in FIG. 6. The additive manufacturing device 402 may include an emitter 404. The emitter 404 may emit a laser, an electron beam, or other energy toward a support bed 406. The emitter 404 may be operatively attached to an actuator 405 (e.g., one or more electric motors) in some embodiments for moving relative to the support bed 406. The support bed 406 may support a collection of particulate material 408. A condition of the material 408 may change as a result of exposure to the laser, electron beam, or other energy from the emitter 404. The support bed 406 may be connected to an actuator 407. The actuator 407 may selectively change elevation of the support bed 406. The outer wall 212 may be formed layer by successive layer as the actuator 407 moves the support bed 406 until the outer wall 212 is completed. In some embodiments, the emitter 404, the actuator 405, and/or the actuator 407 may be in communication with a computerized device (not shown). The computerized device may include computerized memory (RAM or ROM) and a processor. The processor may send control signals to the emitter 404 and/or the actuator 407 based on CAD data that is stored in the memory. The CAD data can correspond to the flow structure 200. Accordingly, the processor may control the emitter 404 and/or the actuator 407 to form the flow structure 200.

In some embodiments, the material 408 may include a plurality of particles made from a metal alloy. The emitter 404 may emit focused energy at particular areas of the material 408, causing adjacent particles to melt and fuse together to form the outer wall 212. The actuator 407 may move the support bed 406 such that the outer wall 212 is formed layer-by-layer and grows along the axis 240. Once formed, the flow structure 200 may be supported atop the support bed 406 as shown.

Figure 4:
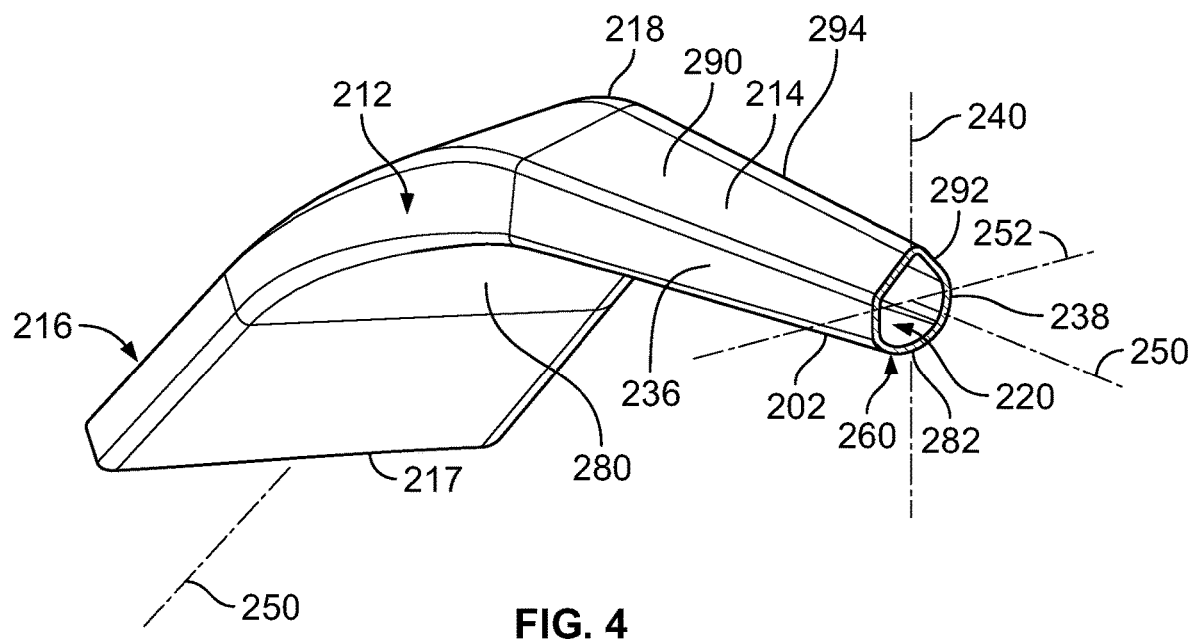
FIG. 4 is an isometric section view of the tube structure taken along the section plane indicated as 4-4 in FIG. 3.
Figure 5:
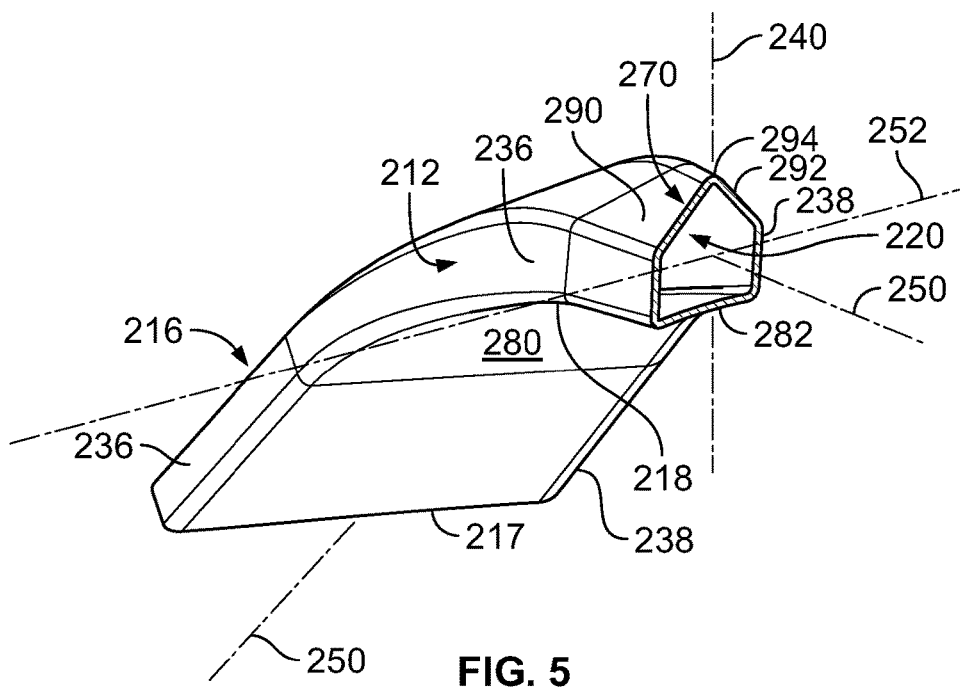
FIG. 5 is an isometric section view of the tube structure taken along the section plane indicated as 5-5 in FIG. 3.

More particularly, during the additive manufacturing process, the lip 219 at the second end 217 of the tube structures 210 may be built initially. Then, the second portion 216 may be progressively built along the growth axis 240. Eventually, an inner surface 280 of the bend 218 (FIGS. 4 and 5) may be formed. An aft facing surface 282 of the first portion 214 may be formed subsequently. Next, the first side 236 and the second side 238 may form progressively and simultaneously. Then, a first canted surface 290 and second canted surface 292 may form progressively and terminate at the ridge 294 (FIGS. 4 and 5). Thus, the ridge 294 may define the apex of the flow structure 200 when formed along the growth axis 240.

In some embodiments of this additive manufacturing process, a solid blank end 296 (FIG. 7) may be formed at the first end 213. The solid blank end 296 may be cylindrical and may have a solid circular cross section taken perpendicular to the axis 250. Subsequently, material may be removed from the flow structure 200 to form the inlets 262 (as shown in phantom in FIG. 7). In some embodiments, for example, tooling 298 (e.g., a drill bit, mill bit, or electrical discharge machining (EDM) tooling) may be used to machine, cut, and remove material from the blank end 296 to form the inlet 262. This machining step ensures that the inlets 262 are accurately formed in a controlled manner.

FIGS. 4 and 5 also show certain features that allows the outer wall 212 to be self-supporting. For example, as shown in FIG. 4, the tube structure 210 may define a first cross section 260 in the first portion 214, proximate the first end 213. The first cross section 260 may be a teardrop-shaped cross-sectional profile. More particularly, at the first cross section 260, the aft facing surface 282 and the first and second sides 236, 238 may be contoured about the axis 250. The first and second canted surfaces 290, 292 may be flat and may be joined at the ridge 294 such that the surfaces 290, 292 are canted (i.e., sloped, pitched, angled, etc.) relative to the growth axis 240. The tube structure 210 may maintain the teardrop-shaped cross section 260 along the axis 250 but may gradually transition to a second cross section 270 (FIG. 5), which is proximate the bend 218. The second cross section 270 may be a house-shaped cross-sectional profile. More particularly, at the second cross section 270, the aft facing surface 282 may be substantially flat, the first and second sides 236, 238 may be flat and may extend transversely to the aft facing surface 282. Also, at the second cross section 270, the first and second canted surfaces 290, 292 may be flat and may be joined at the ridge 294. The first and second canted surfaces 290, 292 and ridge 294 may extend continuously between the first and second cross sections 260, 270. The outer wall 212 may be continuous such that there is a smooth and gradual transition from the first cross section 260 to the second cross section 270 and, further downstream, to the rectangular second portion 216. It will be appreciated that the outer wall 212 may have other cross-sectional shapes without departing from the scope of the present disclosure. In some embodiments, the outer wall 212 may include at least one cross sectional shape that is asymmetrical.

Furthermore, the tube structures 210 may exhibit a lean or tilt in the first portion 214 relative to axis 140. In other words, a part of the axis 250 extending through the first portion 214 may be oriented at non-orthogonal angle relative to axis 140. In some embodiments, the lead/tilt may cause the bend 218 to be disposed further forward in aft direction than the first end 213.

Because the wall 212 forms and grows at a slight angle relative to the growth axis 240 and spans gradually away from the axis 240 rather than spanning directly perpendicular to the growth axis 240, the wall 212 may support itself and collapse is unlikely. Also, the wall 212 is unlikely to build-up heat and warp during formation because there is minimal build up directly parallel with the growth axis 240. It will also be appreciated that the optional vanes 246 are included for providing aerodynamic benefits (i.e., for directing fluid flow) instead of for providing structural support of the outer wall 212. The outer wall 212 can support itself in embodiments where the vanes 246 are omitted. Thus, it will be appreciated that the outer wall 212 can be considered "self-supporting" with or without the vanes 246.

In summary, the combination diffuser and deswirl flow structure 200 of the present disclosure may provide advantageous aerodynamic performance for improving performance of the gas turbine engine 100. The structure 200 may be compact and lightweight. Also, the structure 200 may be strong and robust. Furthermore, the structure 200 may be manufactured efficiently.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A diffuser and deswirl flow structure for a gas turbine engine defining a longitudinal axis, the fluid flow structure comprising:
   a plurality of tube structures including an outer wall that is hollow and elongate, and that extends between a first portion and a second portion of the respective one of the plurality of tube structures, the plurality of tube structures disposed in an annular arrangement about the longitudinal axis;
   a plurality of flow passages extending through respective ones of the plurality of tube structures, the plurality of flow passages extending from the first portion to the second portion, respectively;
   the plurality of flow passages respectfully including a diffuser portion, which is proximate the first portion and configured to diffuse a fluid flow from a compressor wheel, the plurality of flow passages respectfully including a deswirl portion, which is proximate the second portion and configured to deswirl the fluid flow from the diffuser portion;
   the outer wall defining the diffuser portion and the deswirl portion; and
   the outer wall being self-supporting.

2. The flow structure of claim 1, wherein the flow structure is monolithic and unitary with the plurality of tube structures being integrally attached in the annular arrangement.

3. The flow structure of claim 2, wherein the annular arrangement is centered on the longitudinal axis;
   wherein the flow structure defines an additive manufacturing growth axis along which the outer wall is additively layered; and wherein the growth axis is parallel to the longitudinal axis.

4. The fluid flow structure of claim 3, wherein the flow structure defines a leading end and a trailing end;
   wherein the growth axis is directed from the leading end toward the trailing end;
   wherein the second portion defines an aft end of the flow structure, and wherein the flow structure defines a forward end;
   wherein the leading end corresponds to the aft end, and wherein the trailing end corresponds to the forward end.

5. The fluid flow structure of claim 3, wherein the flow structure defines a leading end and a trailing end;
   wherein the growth axis is directed from the leading end toward the trailing end;
   wherein the outer wall includes a ridge that defines the trailing end; and
   wherein the outer wall includes a canted surface that terminates at the ridge, the canted surface being canted relative to the growth axis.

6. The fluid flow structure of claim 5, wherein the outer wall defines a first cross-sectional profile;
   wherein the first cross-sectional profile includes a first canted part and a second canted part that are attached at the ridge.

7. The fluid flow structure of claim 6, wherein the outer wall defines a second cross-sectional profile having a shape that is different from the first cross-sectional profile;
   wherein the first canted part, the second canted part, and the ridge extend continuously between the first and second cross-sectional profiles; and
   wherein the outer wall gradually transitions between the first and second cross-sectional profiles.

8. The fluid flow structure of claim 2, wherein the annular arrangement is centered on the longitudinal axis;
   wherein the flow structure defines an additive manufacturing growth axis along which at least part of the outer wall is additively layered; and
   wherein at least one of the plurality of flow passages includes a machined portion.

9. The fluid flow structure of claim 1, wherein the annular arrangement is centered on the longitudinal axis; and
   wherein the first portion is tilted relative to the longitudinal axis.

10. The fluid flow structure of claim 1, wherein the annular arrangement is centered on the longitudinal axis;
    wherein the first portion extends substantially radially with respect to the axis;
    wherein plurality of tube structures respectfully include a bend between the first portion and the second portion; and
    wherein the bend orients the second portion longitudinally with respect to the longitudinal axis.

11. The fluid flow structure of claim 1, wherein the second portion includes at least one vane therein.

12. The fluid flow structure of claim 1, further comprising a space defined between neighboring ones of the first portions of the plurality of tube structures.

13. A tube structure for a flow structure of a gas turbine engine, the tube structure configured for annular arrangement with a plurality of additional tube structures about a longitudinal axis to define the flow structure, the tube structure comprising:
    an outer wall that is hollow and elongate and that extends between a first portion and a second portion along a tube axis;
    a flow passage extending through the tube structure along the tube axis from the first portion to the second portion;
    the flow passage including a diffuser portion, which is proximate the first portion and configured to diffuse a fluid flow from a compressor wheel, the flow passage respectfully including a deswirl portion, which is proximate the second portion and configured to deswirl the fluid flow from the diffuser portion;
    the outer wall defining the diffuser portion and the deswirl portion; and
    the outer wall being self-supporting.

14. A method of manufacturing a diffuser and deswirl flow structure for a gas turbine engine defining a longitudinal axis, the method comprising:
    forming a plurality of tube structures respectively including an outer wall that is hollow and elongate, and extending respectively between a first portion and a second portion, the plurality of tube structures disposed in an annular arrangement about the longitudinal axis;
    defining a plurality of flow passages extending through respective ones of the plurality of tube structures, the plurality of flow passages extending from the first portion to the second portion, respectively;
    the plurality of flow passages defined to respectively include a diffuser portion, which is proximate the first portion and configured to diffuse a fluid flow from a compressor wheel, the plurality of flow passages defined to respectively include a deswirl portion, which is proximate the second portion and configured to deswirl the fluid flow from the diffuser portion;
    the outer wall defining the diffuser portion and the deswirl portion; and
    the outer wall being self-supporting.

15. The method of claim 14, wherein forming the plurality of tube structures includes additively manufacturing the plurality of tube structures.

16. The method of claim 15, wherein forming the plurality of tube structures includes additively manufacturing the plurality of tube structures simultaneously such that the flow structure is monolithic and unitary with the plurality of tube structures integrally attached in the annular arrangement.

17. The method of claim 16, wherein additively manufacturing the plurality of tube structures includes centering the annular arrangement on the longitudinal axis;
    wherein additively manufacturing the plurality of tube structures includes additively manufacturing the flow structure along an additive manufacturing growth axis; and
    wherein the growth axis is parallel to the longitudinal axis.

18. The method of claim 17, wherein additively manufacturing the flow structure includes additively manufacturing the flow structure along the growth axis from a leading end toward a trailing end of the flow structure;
    wherein the second portion defines an aft end of the flow structure, and wherein the flow structure defines a forward end;
    wherein the leading end corresponds to the aft end, and wherein the trailing end corresponds to the forward end.

19. The method of claim 17, wherein additively manufacturing the flow structure includes additively manufacturing the flow structure along the growth axis from a leading end toward a trailing end of the flow structure;
    wherein the outer wall includes a ridge that defines the trailing end; and wherein the outer wall includes a canted surface that terminates at the ridge, the canted surface being canted relative to the growth axis.

20. The method of claim 15, wherein additively manufacturing the plurality of tube structures includes additively manufacturing a portion of one of the plurality of flow passages and additively manufacturing a solid blank; and
   further compromising machining the solid blank to form an inlet aperture that is fluidly connected to the one of the plurality of flow passages.

* * * * *